US012649106B2

(12) United States Patent
Neal et al.

(10) Patent No.: US 12,649,106 B2
(45) Date of Patent: Jun. 9, 2026

(54) TECHNIQUES FOR TRANSITIONING BETWEEN LOCATIONS IN A VIRTUAL ENVIRONMENT

(71) Applicant: NetEase Information Technology Corporation, Pasadena, CA (US)

(72) Inventors: Brian Neal, Los Angeles, CA (US); Robert Bray, Leeds (GB); Ross Alan Gardner, Irvine, CA (US); Guillermo Valdez, Santa Ana, CA (US); Jeff Sumter, Mission Viejo, CA (US); Neil Dorrington, Merseyside (GB)

(73) Assignee: NetEase Information Technology Corporation, Pasadena, CA (US)

( * ) Notice: Subject to any disclaimer, the term of this patent is extended or adjusted under 35 U.S.C. 154(b) by 357 days.

(21) Appl. No.: 18/538,298

(22) Filed: Dec. 13, 2023

(65) Prior Publication Data
US 2025/0196000 A1     Jun. 19, 2025

(51) Int. Cl.
| | |
|---|---|
| *A63F 13/52* | (2014.01) |
| *A63F 13/35* | (2014.01) |
| *A63F 13/87* | (2014.01) |
| *A63F 13/55* | (2014.01) |
| *A63F 13/822* | (2014.01) |

(52) U.S. Cl.
CPC .............. *A63F 13/52* (2014.09); *A63F 13/35* (2014.09); *A63F 13/87* (2014.09); *A63F 13/55* (2014.09); *A63F 13/822* (2014.09)

(58) Field of Classification Search
None
See application file for complete search history.

(56) References Cited

U.S. PATENT DOCUMENTS

| | | | | |
|---|---|---|---|---|
| 6,767,287 B1 * | 7/2004 | Mcquaid | ................. | A63F 13/30 463/29 |
| 2004/0143852 A1 * | 7/2004 | Meyers | ................. | A63F 13/822 463/43 |
| 2009/0267938 A1 * | 10/2009 | Nicol, II | ................. | A63F 13/57 345/419 |

OTHER PUBLICATIONS

"Ratchet & Clank", (video game 2002) page, Wikipedia, The Free Encyclopedia, https://en.wikipedia.org/w/index.php?title=Ratchet_%26_Clank&oldid=1188061002, page version Dec. 3, 2023, 25pgs.

(Continued)

*Primary Examiner* — Damon J Pierce
(74) *Attorney, Agent, or Firm* — Hickman Becker Bingham Ledesma LLP; Stephen J. Walder, Jr.

(57) ABSTRACT

Techniques for performing region-to-region transitions between regions of a virtual environment are provided. In a viewing-phase of a transition, a user remains in a current region of the virtual environment, but sees, within that current region, a portal marker that displays an out-of-phase depiction of a target region. If the user performs a transition-triggering action, a transition phase begins in which the user is moved to a transition region that is locally generated, allowing the client application of the user to be disconnected from all dedicated servers. While in the transition region, a match-making operation is performed to match the user to an instance of the target region. Once matched, the user is transitioned to the selected instance of the target region by sending to the client application information about the dynamic elements of the instance, thereby allowing the client application to gradually materialize an in-phase depiction of the instance.

21 Claims, 21 Drawing Sheets

(56)                References Cited

OTHER PUBLICATIONS

"Portal", (2007 video game) page, Wikipedia, The Free Encyclo-
pedia, https://en.wikipedia.org/w/index.php?title=Portal_(video_
game)&direction=prev&oldd=1190025233, page version Dec. 11,
2023, 26pgs.

* cited by examiner

TECHNIQUES FOR TRANSITIONING BETWEEN LOCATIONS IN A VIRTUAL ENVIRONMENT

FIELD OF THE INVENTION

The present invention relates to computer-implemented virtual environments and, more specifically, to techniques for transitioning between locations within a virtual environment.

BACKGROUND

Many computer applications, including but not limited to games, involve display of and interaction within a virtual environment. For example, in many games, users control the actions of an avatar that is displayed within a virtual environment. In response to user input, the avatar may travel from place to place within the virtual environment, interacting with the environment, virtual items within the environment, non-player characters (NPCs), and/or the avatars of other players.

The virtual environments provided by such applications may be massive, requiring days, weeks or even months for a user's avatar to fully explore. Given the vastness of such virtual environments, it is often the case that it is not possible for the local device of a user to store all of the virtual environment data (VED) for the entire virtual environment used by a client application that is installed on the local device. This is particularly true when the local device has relatively limited storage, such as a game consul or a mobile device. Consequently, it is common for client applications that display virtual environments to obtain only the portion of VED that is needed to display a "current region" of the virtual environment. As used herein, the "current region" of a user refers to the region of the virtual environment to which the user currently "belongs". Thus, in client applications that involve avatars, the current region is typically the region of the virtual environment in which the avatar of the user currently resides.

When client devices download only the portion of the VED needed for the current region, the hardware limitations of the client devices do not constrain the size, complexity, and quality of the virtual environment. However, when the current region changes, the user of the client application may experience a delay as the client application obtains the portion of the VED that corresponds to the new current region. Such delays may be significant, and extremely annoying, to the users of such client applications.

Region-to-region transition delays may be shortened by dividing the virtual environment into smaller regions, thereby reducing the amount of VED that needs to be transferred to a client application with each transition. However, having smaller regions will also increase the frequency of transitions, thereby increasing the frequency at which such delays occur. Thus, it is clearly desirable to reduce the delays experienced by users of client applications that display virtual environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein to make region-to-region transition operations appear relatively seamless to users of client applications that depict virtual environments. In region-to-region transitions, the displayed portion of the virtual environment changes from a "source region" (the current region prior to the region-to-region transition) to a "target region" (the current region after the region-to-region transition).

The techniques described herein allow users to have the impression that the virtual environment inhabited by their avatars is one giant connected digital play space, without actually consuming the resources that would be required to instantiate a seamless open world. By using the region-to-region transition techniques described herein, players move from one region (also referred to as "level" or "game mode") to another, potentially being matchmade with other players and/or kept with their current party.

The techniques include replacing static loading screens with dynamic animations. In one implementation, the dynamic animations depict a portion of the target region from a perspective (position and angle) of an entry point of the target region. For example, a system in which the user's view of the virtual world is based on the position of the user's avatar in the virtual world, the system may:

determine that, after transition to a target region, the position of a user's avatar will be in a particular location (entry point) within the target region, and prior to the region-to-region transition, display a depiction of the target region from the perspective of that particular location In one implementation, the depiction of the target region is generated using portal rendering with shaders to shade the virtual environment with correct perspective.

Portals

As used herein, a "portal" is a location (e.g. point in virtual 3D space), within a virtual environment, which when approached by a user (e.g. via user-controlled movement of the user's avatar), will initiate a region-to-region transition to an instance of a different region of the virtual environment. In one implementation, the virtual environment may include a "portal marker" for each portal. The portal marker of a portal is a visual element, associated with the portal. The portal marker of a portal is typically located at or near the corresponding portal. The portal marker of each portal may be, for example, a virtual "screen" that depicts a view of the region that is associated with the portal.

Figure 4:
FIG. 4 is a block diagram that depicts a virtual environment, that includes an avatar, in which a portal marker serves as a virtual screen to a target region, according to one implementation.

Referring to FIG. 4, it depicts a virtual environment that includes an avatar 400. The depiction of avatar 400, as well as the surroundings of the current region 402, are displayed by the client application to the user that controls avatar 400. In the example illustrated in FIG. 4, the user's avatar is facing a portal to another region. The portal is indicated by the portal marker 404. In the illustrated embodiment, the portal marker is an irregularly shaped screen region that depicts an out-of-phase version of the region that that is associated with the portal.

In one implementation, a given portal may be associated with a particular game mode. For example, in one implementation, portal A may be associated with a playlist of a game type "Winner Stays On". Portal B may be associated with a playlist of a game type "All In". Portal C may be associated with a playlist of a game type "Stunt Race". When a user uses a portal associated with a game mode to initiate a region-to-region transition, the user is transitioned to an instance of a region in which the user may play a game in that particular game mode.

In one implementation, the users that use a portal to initiate a region-to-region transition do not choose the specific map/instance they will load into when joining a game. Instead, the portal marker may merely depict the region/game-type/game-mode associated with the portal. The specific map/instance to which the user is ultimately connected may be selected automatically using a match making process, one implementation of which is described in greater detail hereafter. Because the specific instance is selected automatically, fragmentation of player numbers may be avoided by causing sessions to be as populated as possible. Players on a playlist will eventually rotate through all maps of a selected game mode if they choose to keep replaying after each game finishes. Rather than be associated with a single game mode, some portals may be associated with "mixed playlists" that are made up of a combination of game modes.

To help players navigate to the regions/play-modes that they want to enter, it is desirable for the portal marker associated with each portal to depict an image that readily visually identifies the mode type (or combination of mode types) associated with the portal. Portal markers that depict out-of-phase versions of the regions to which they lead shall be described in greater detail hereafter.

Region Types

In one implementation, the virtual environment may have several general types of regions, including but not limited to "social area regions", "cooperative mission regions", and "digital dungeon regions". Social area regions do not lead to a game playlist. Rather, social area regions are associated with a fixed level and game mode, such as a "virtual nightclub" or a "virtual restaurant". Social area regions may give players the impression that the player is entering a building from the exterior. For example, a portal in region A may be outside a "nightclub building" located in region A. On entering the portal, the player will be matched with a suitable instance of a region B that represents the club's interior.

Cooperative mission regions, on the other hand, are associated with game playlists. In one implementation, a user's ability to enter a portal (to initiate a region-to-region transition) may be dictated, at least in part, on the user's progression through a mission flow. For example, region A may have a portal B in front of a "mission control" building. Upon entering portal B, the user may be transitioned to an automatically matched instance of a cooperative mission region for a "next mission" in the user's local mission flow. In situations where a player has a choice of missions, the user can access multiple portals outside the "mission control" building.

A "digital dungeon" region is a region that is associated with a dungeon play mode. In a game that has multiple distinct digital dungeon regions, a single portal may be used to take a player to any suitable digital dungeon. In an alternative implementation, each distinct digital dungeon region may have its own distinct portal.

To represent portals that a player cannot enter, the portal marker of such portals may be tinted in a particular manner. In addition, the game system may display a message if the player tries to enter. An alternative to having multiple mission control portals is for a user to select the desired mission from a user interface (UI) upon entering the portal, if several are available to the local player simultaneously.

Region-to-Region Transitions Using Portals

In one implementation, techniques are provided for generating an accurate depiction of a target region during region-to-region transitions in games that make use of the Unreal Engine. Details about the Unreal Engine are available at www.unrealengine.com, the entire contents of which are hereby incorporated herein by this reference.

For the purpose of explanation, it shall be assumed that the current region of a user is a region that has a plurality of portals. For example, assume that a virtual environment has regions A-Z. Assume further that region A includes portals B-Z which, when entered, will cause transition to instances of regions B-Z, respectively. In games where users are not tied to a linear storyline, users in region A may be free to choose (e.g. via movement of their avatar) to enter any one of the portals B-Z.

When a user whose avatar is currently in region A moves to portal B, a region-to-region transition is performed which results in the user's avatar moving to an instance of region B. Since the user's choice of portal is not dictated by the game and/or known ahead of time, it is difficult for the virtual environment application to perform the preliminary processing to needed to produce a seamless region-to-region transition to an instance of whatever region the user ultimately chooses. A seamless region-to-region transition is particularly difficult if some of the regions to which the user may transition are themselves dynamically populated regions (e.g. regions associated with user-designed properties).

As shall be described in greater detail hereafter, region-to-region transitions are handled in phases. Specifically, a "view-triggering action" initiates a viewing phase. The view-triggering action for a target region may be, for example, a user's avatar moving within a certain distance of a portal for the target region. As another example, an avatar's entry into a three-dimensional view-triggering subregion (of any shape) that is associated with a portal may be the view-triggering action. In such an implementation, the portal itself would typically be located within the view-triggering subregion for the portal.

Referring again to FIG. 4, it depicts what a user may see during the viewing phase. In the illustrated example, the viewer sees (a) the user's avatar 400, (b) the environment of the current region 402, and (c) a portal marker 404 that depicts a view of the region associated with the portal. As illustrated by this example, during the viewing-phase, a user remains in the user's current region, but is able to see a depiction of the target region.

In response to a user that is in the viewing-phase performing a "transition-triggering action", a transition-phase is started. The transitioning-triggering action may be, for example, the avatar getting even closer to the portal of the target region. The transaction-triggering action may be an avatar's entry into a three-dimensional transition-triggering subregion (of any shape) that is associated with the portal. In such an implementation, the transition-triggering subregion will typically be smaller than and completely contained within the view-triggering subregion, and the portal will typically be contained within the transition-triggering subregion. The occurrence of the transition-triggering action is when the user is said to "enter the portal".

In one implementation, when the user enters the portal, various actions occur, including:

an instance of the target region is automatically selected,
   information about the dynamic content of the selected
      instance is sent to the user's client application, and
   a "portal transition display" is initiated.

At the end of the transition phase, the user's avatar is located at an entry point within the instance of the target region. Each of these actions shall be described in greater detail hereafter.

The Viewing Phase of Region-to-Region Transitions

In one implementation, as a user's avatar in region A approaches portal B, a view-triggering action occurs and a depiction of region B is automatically rendered and displayed to the user. The depiction may be displayed, for example, on a virtual display screen, located at portal B within region A.

In one implementation, the depiction of region B includes only the static elements of region B, to avoid the need of real-time replication of any dynamic elements from any specific instance of region B. A depiction of only the static elements of an instance of a region is referred to herein as an "out-of-phase" depiction of the region. In contrast, a depiction of both the static and dynamic elements of an instance of a region is referred to as an "in-phase" depiction of the instance of the region.

As the user's avatar enters the view-triggering subregion associated with portal B, the portal marker at the portal B location may begin to show an out-of-phase depiction of region B from the perspective that the user's avatar will have if the user completes the region-to-region transition to region B. In one implementation, while the user's avatar moves within the view-triggering subregion of portal B, the user's viewing angle of the portal marker for portal B changes. In response to a change in the viewing angle of the portal marker, the view of the out-of-phase depiction of region B, displayed on the portal marker, also changes.

For example, if the user's avatar, in the view-triggering subregion for portal B, South of portal B, then the depiction of region B will be of static content, in region B, that is North of the entry position within region B. If the user then looks at the screen after moving to a position in the view-triggering subregion of portal B that is East of portal B, then the depiction of region B on the screen will be of static content, in region B, that is West of the entry position within region B.

To generate the depiction of region B from the proper perspective using the Unreal Engine, as the user's avatar approaches portal B, game logic builds a level hierarchy for region B on-the-fly. Each static content item of region B is assigned to a level in the level hierarchy. The level to which a content item is assigned dictates the sequence in which that content item is rendered relative to other content items at different levels in the level hierarchy. For example, assume that the level hierarchy has levels 1, 2 and 3. In such an implementation, every static content item needed to depict region B is assigned on one of the three levels. When rendering the depiction of region B, content items assigned to level 1 are rendered first, followed by content items assigned to level 2, followed by content items assigned to level 3.

The Transition Phase of Region-to-Region Transitions

While in the viewing phase, a user may perform a transition-triggering action. This may happen, for example, if a user that approached portal B confirms the user's intent to transition to region B by continuing to get closer to portal B. In response to the transition-triggering action, the user that approached portal B (the "transitioning user") and any users that are associated with the transitioning user are "moved into" the target instance of region B.

In one implementation, moving a user into an instance of a target region involves selecting a target instance of the target region, and sending to the client application of the transitioning user:

information regarding the dynamic elements of an
      instance of the target region, and
   the current state of those dynamic elements.

With this information, the client application is able to render the in-phase depiction of the instance of the target region. Obtaining the information necessary to complete the transition to the selected instance takes time. Therefore, in one implementation, a dynamic "portal transition display" is displayed to the transitioning user, rather than a static "loading screen".

The Portal Transition Display

As mentioned above, in one implementation, conventional static "loading screens" are replaced with dynamic portal transition displays to make region-to-region transitions appear seamless despite the latency incurred by the player-to-instance match-making process and the communication of instance-specific content and state information. In one implementation, to avoid increasing the region-to-region transition delay, the portal transition display is generated locally by the client applications based on information they already have and/or information they are already retrieving to perform the region-to-region transition to the target instance.

Figure 5:
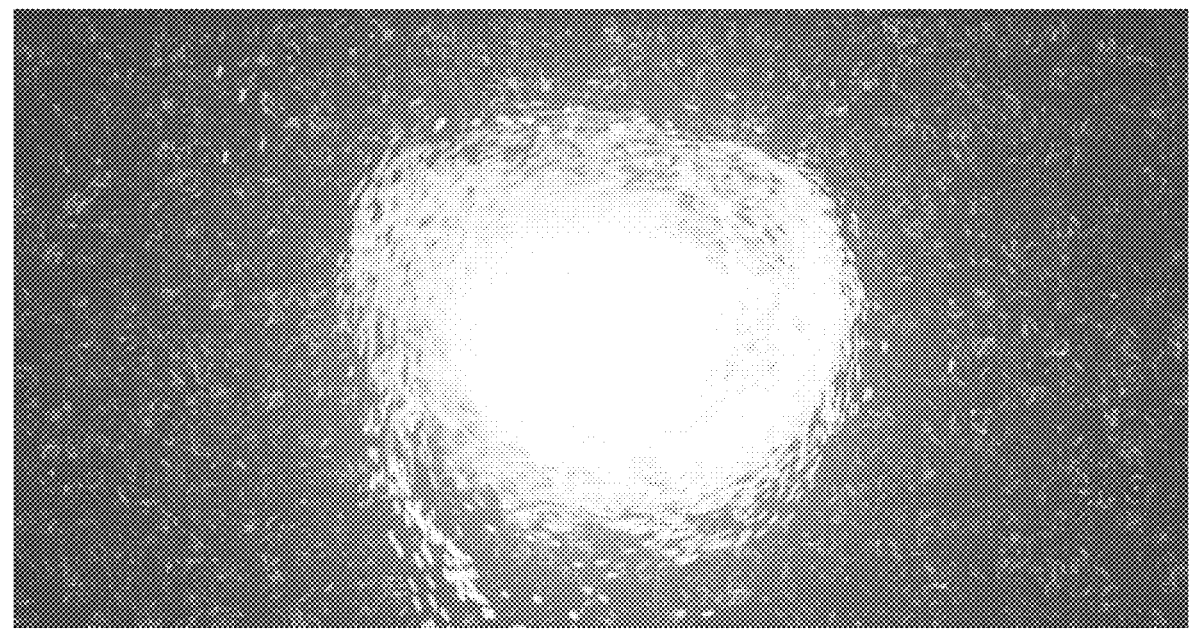
FIG. 5 depicts what the screen image may look like at one point during the visual dematerialization of the source region, in one implementation.

In one implementation, on a player's avatar entering a portal, the client application of the player causes the visual depiction of the source region to visually "dematerialize". This may be performed, for example, by causing the screen image of the source region to dissolve and swirl in a pin-wheel fashion. FIG. 5 depicts what the screen image may look like at one point during the visual dematerialization of the source region.

Once the dematerialization of the source region has been completed, the user is loaded into a "transition region". Unlike other regions (e.g. the source region and the target region), the transition region does not correspond to any particular instance on a game server. Instead, the transition region is generated locally by the transitioning player's client application.

While in the transition region, a player is not connected to any dedicated game server. During this time, the transitioning player (or the transitioning player's team) is being automatically matched to an appropriate server that is running an instance of the target region. Once an appropriate server has been found, the player transitions out of the transition region and is loaded into the selected instance of the target region.

In one implementation, the transition-region-to-target-region transition is visually seamless as the swirling pixels coalesce into a view of the instance of the target region whose view angle is dictated by the user's avatar, which materializes at an entry point of the instance of the target region. FIGS. 8A-8M represent an animation sequence in which the image of the source region dematerializes, and an image of the selected instance of the target region, which includes a depiction of the transitioning player's avatar, gradually materializes.

Figure 8A:
FIGS. 8A-8M depict snapshots from an animation sequence in which an image of the source region dematerializes, the transition region is a swirling vortex, and an image of an instance of the target region gradually materializes, according to an implementation.
Figure 8B:
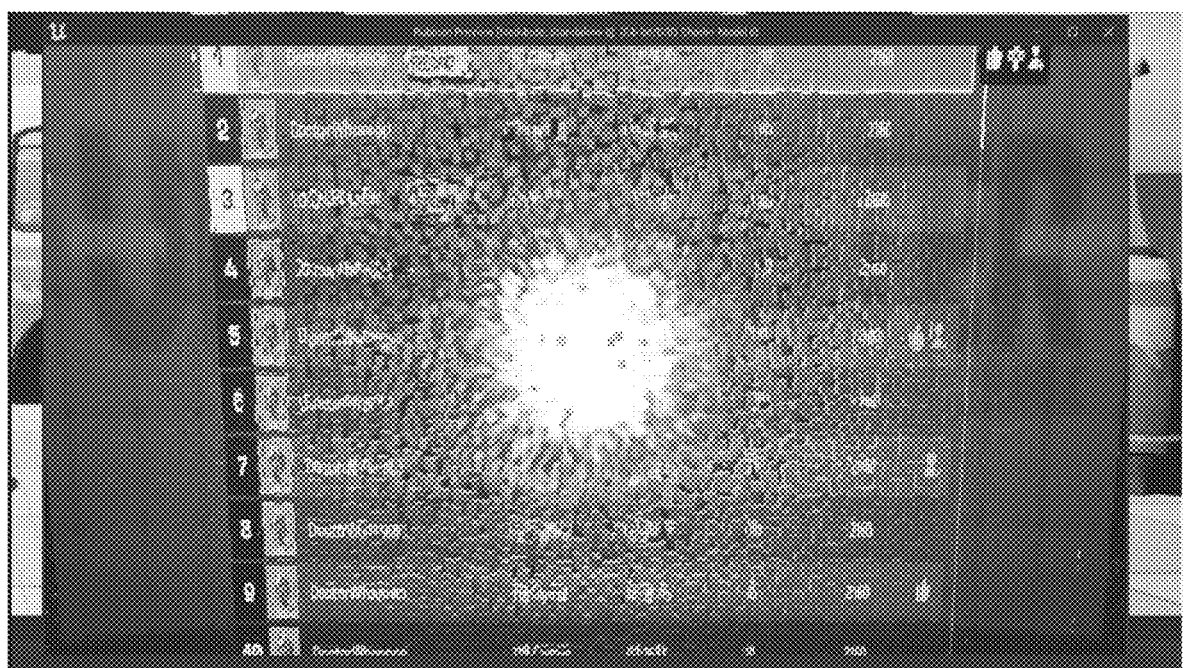
Figure 8C:
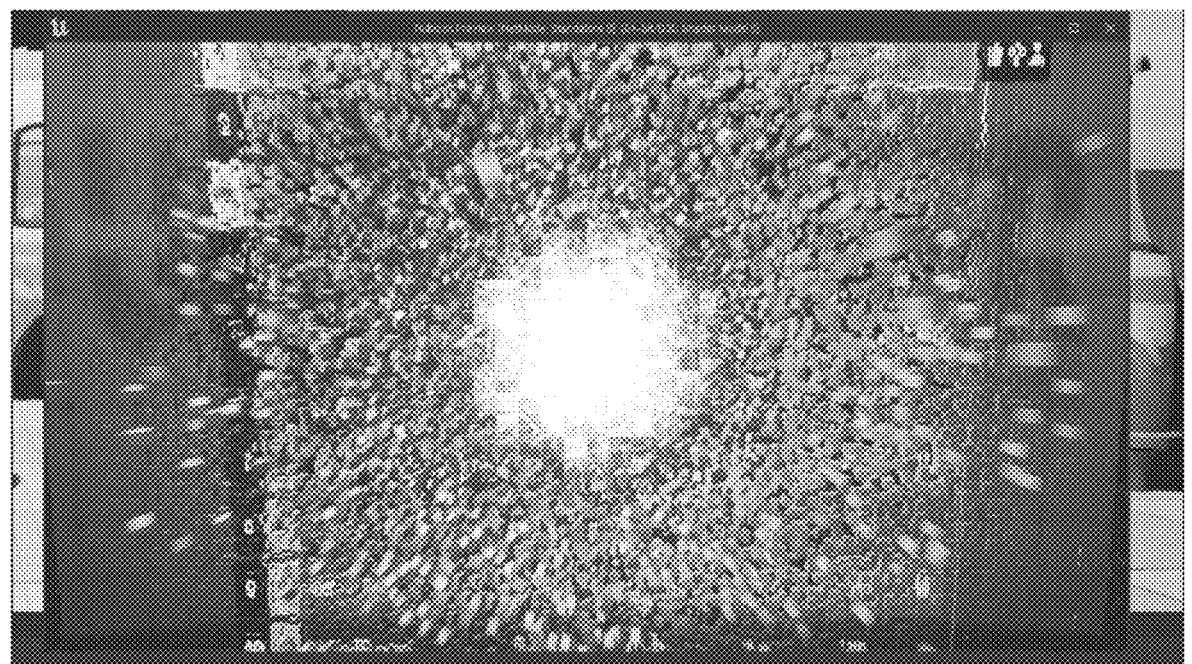
Figure 8D:
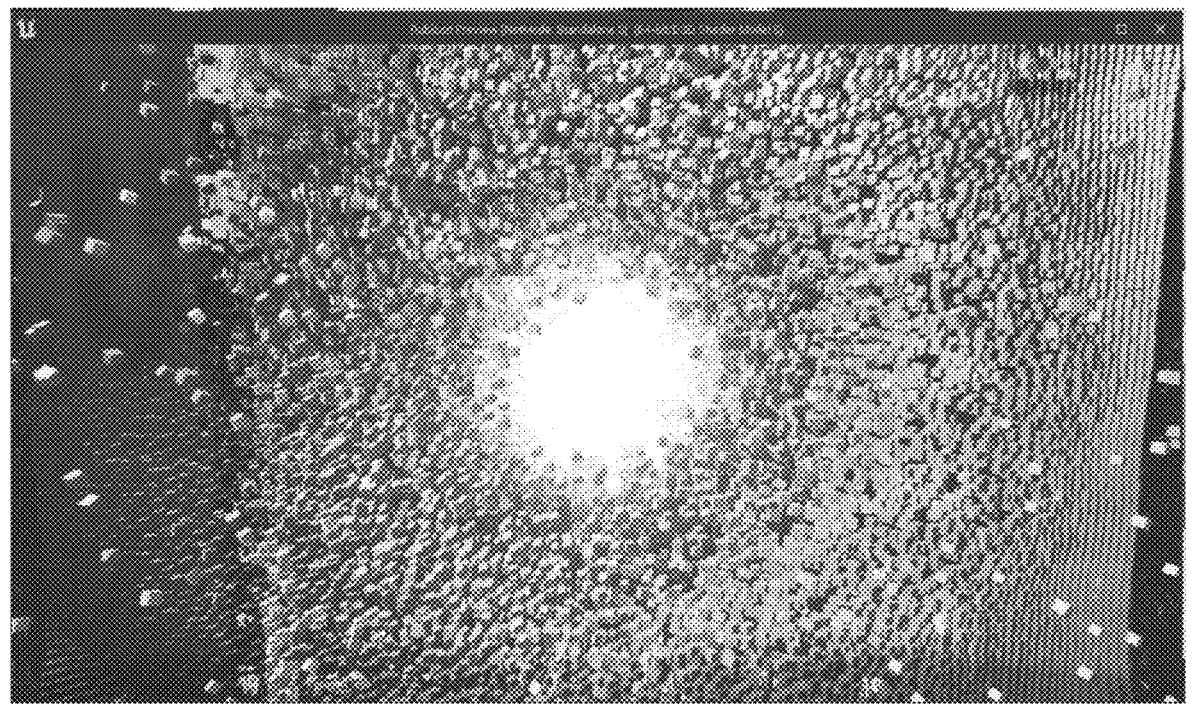
Figure 8E:
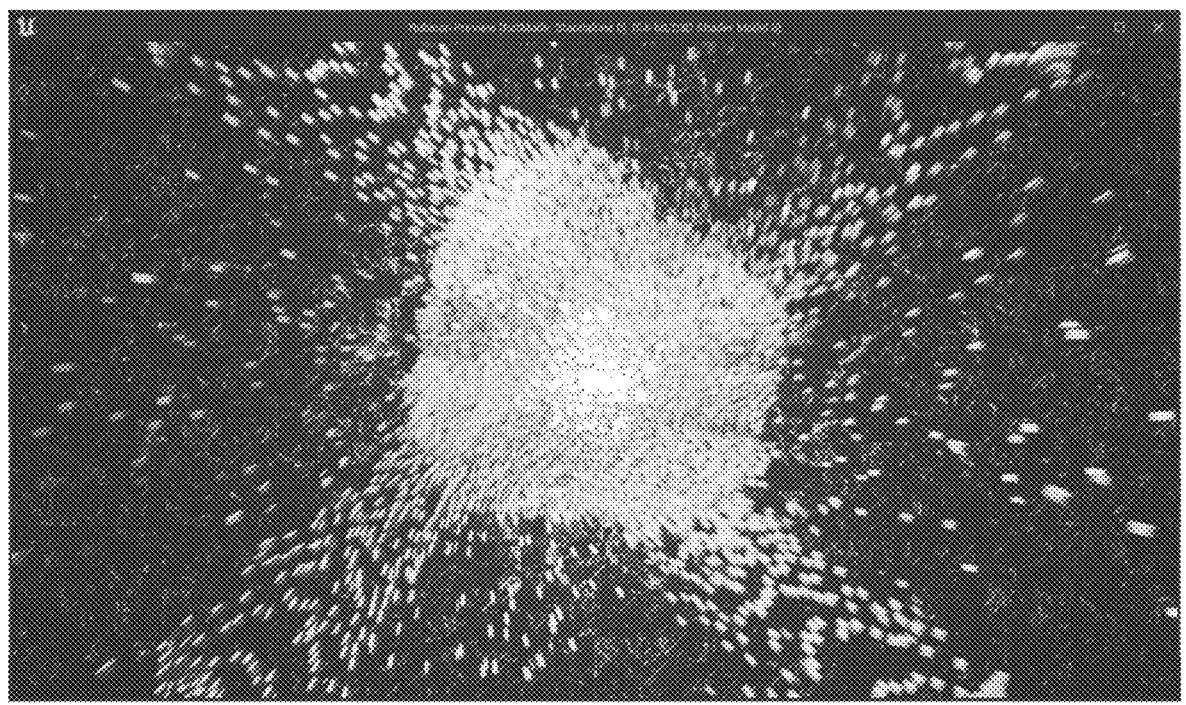
Figure 8F:
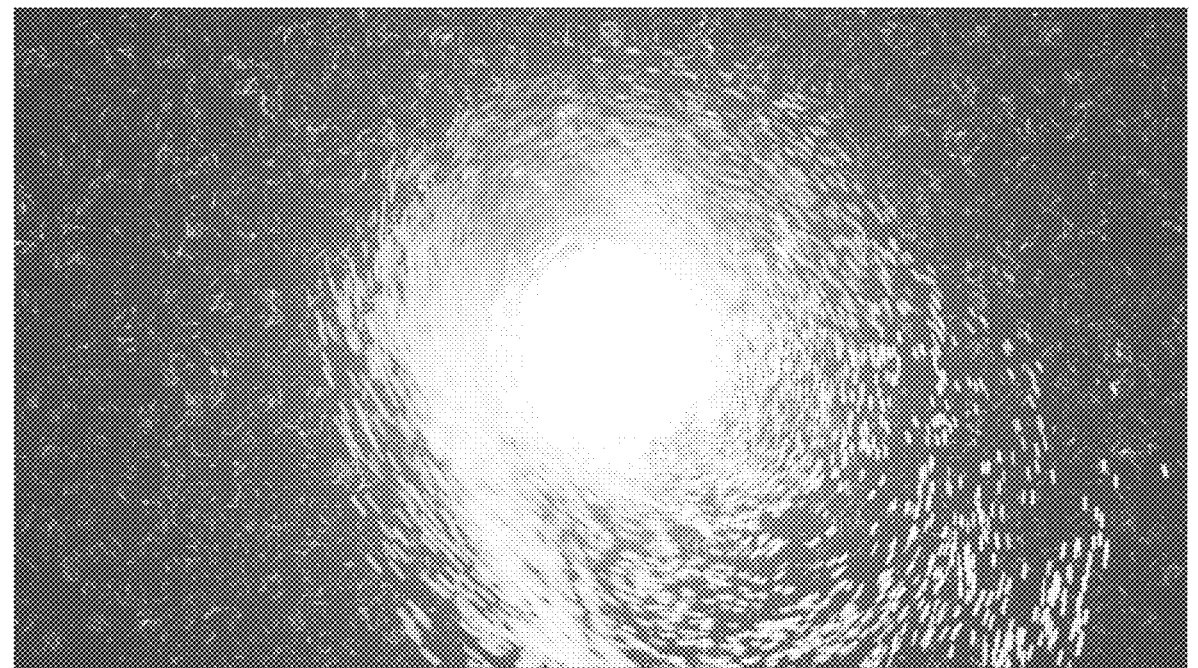

FIG. 8A depicts the image of the source region prior to dematerialization. FIG. 8B depicts the image of the source region as the dematerialization process begins. In the illustrated implementation, dematerialization involves breaking the image of the source region into distinct blocks of pixels, and causing those pixel blocks to swirl in the manner of a vortex. FIG. 8C depicts an image of the source region as the dematerialization process continues. FIG. 8D depicts a point in the dematerialization process in which very little of the source region image is recognizable. FIG. 8E depicts swirling pixel boxes that represent, on one implementation, the transition level. After shrinking, the swirling vortex may grow again as the matchmaking process proceeds and an instance of the target region is selected, as illustrated by FIG. 8F.

Figure 8G:
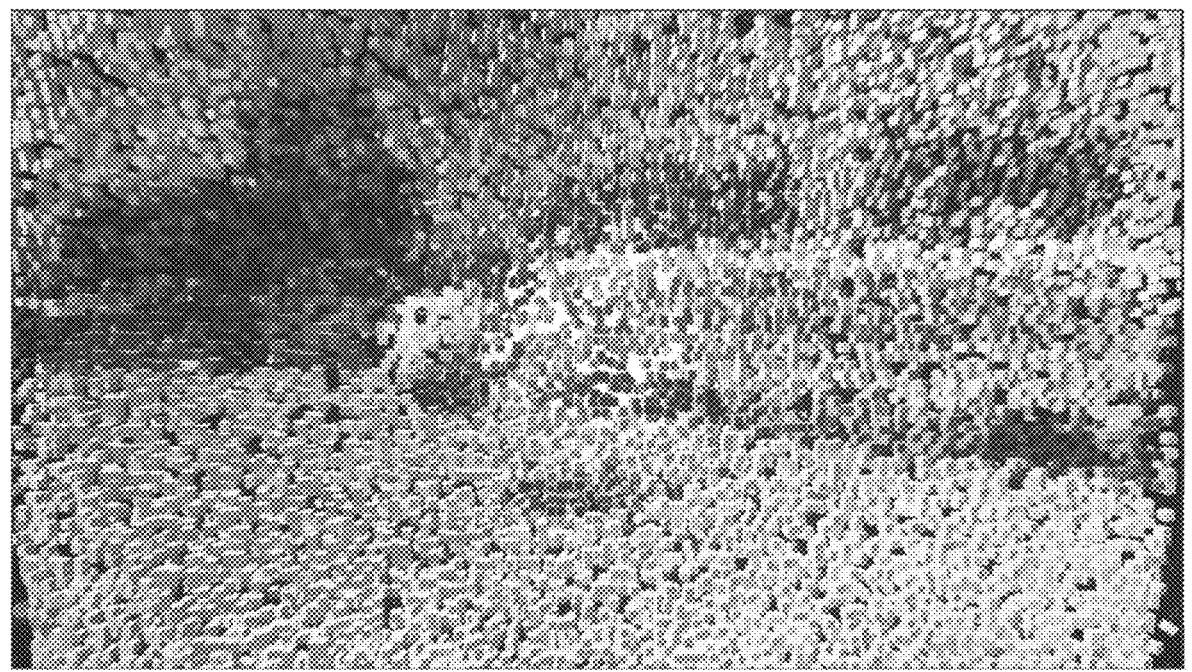
Figure 8H:
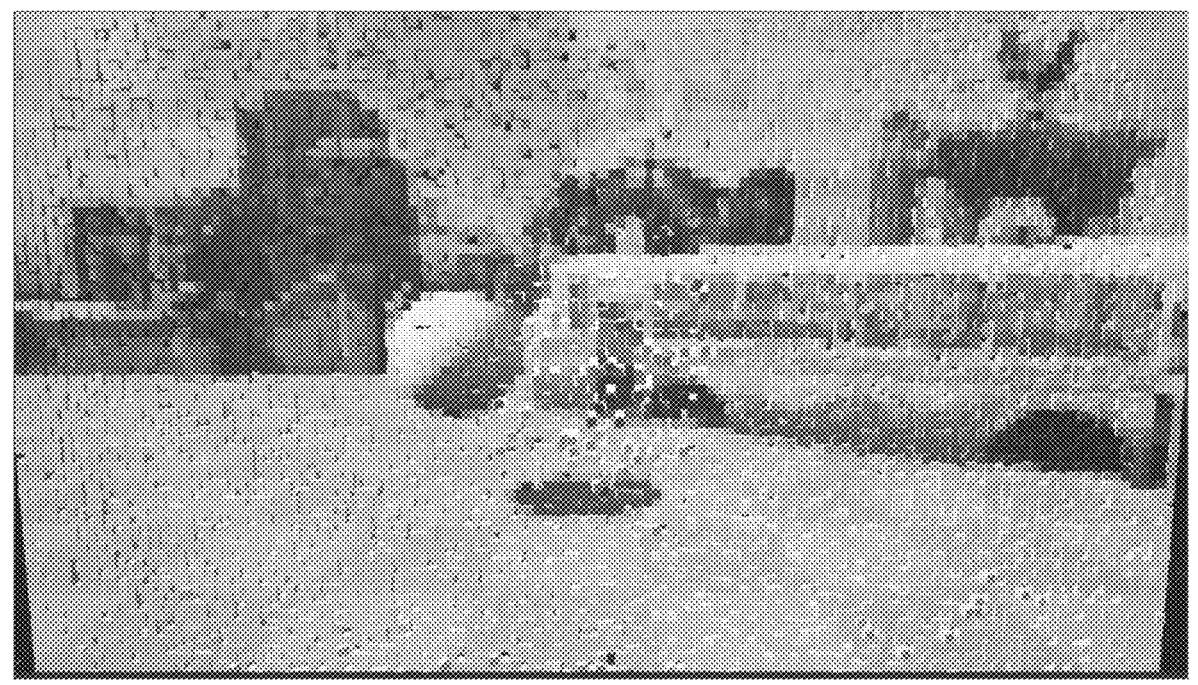
Figure 8I:
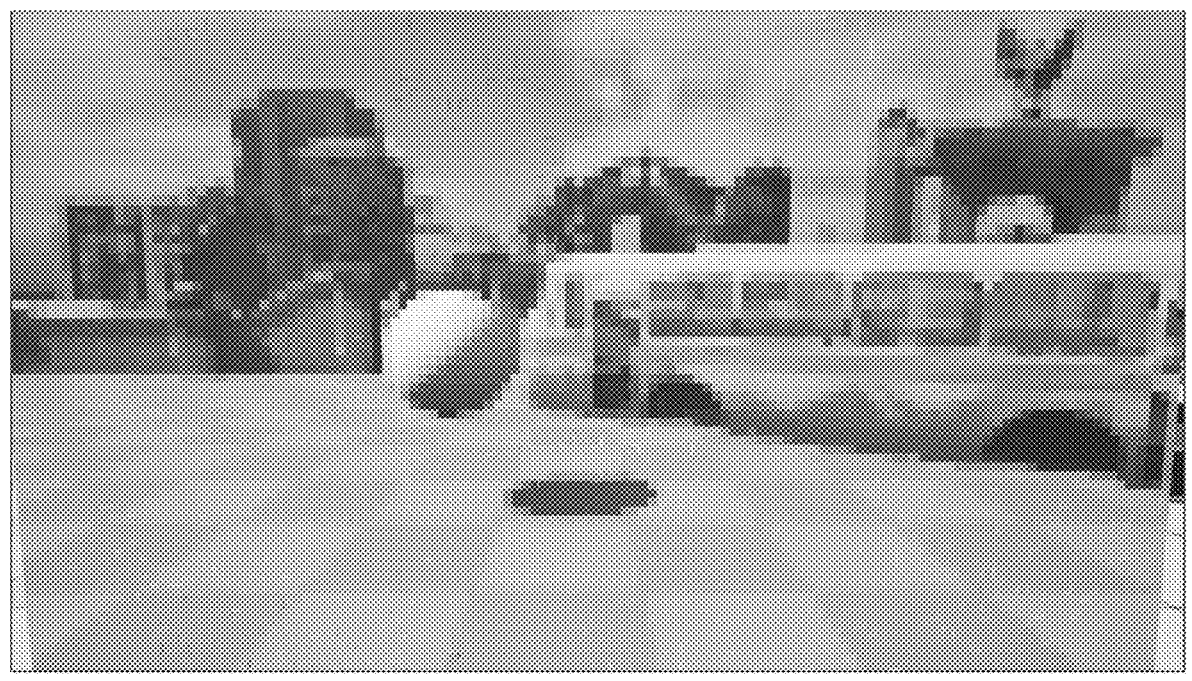
Figure 8J:
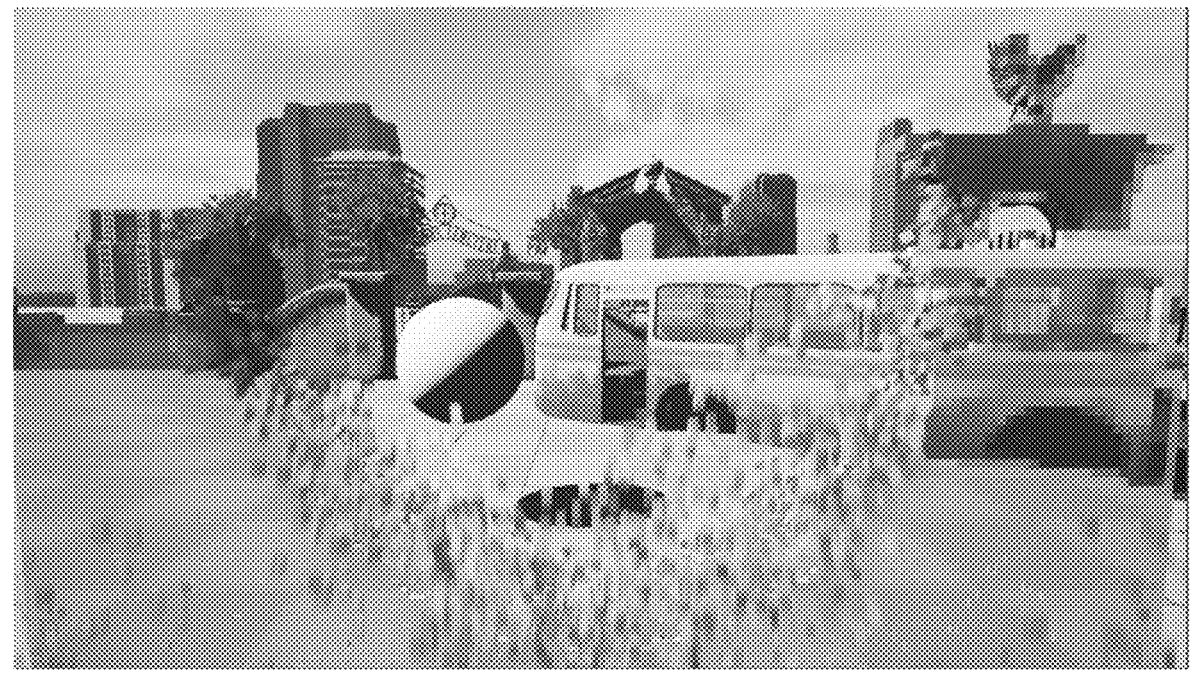
Figure 8K:
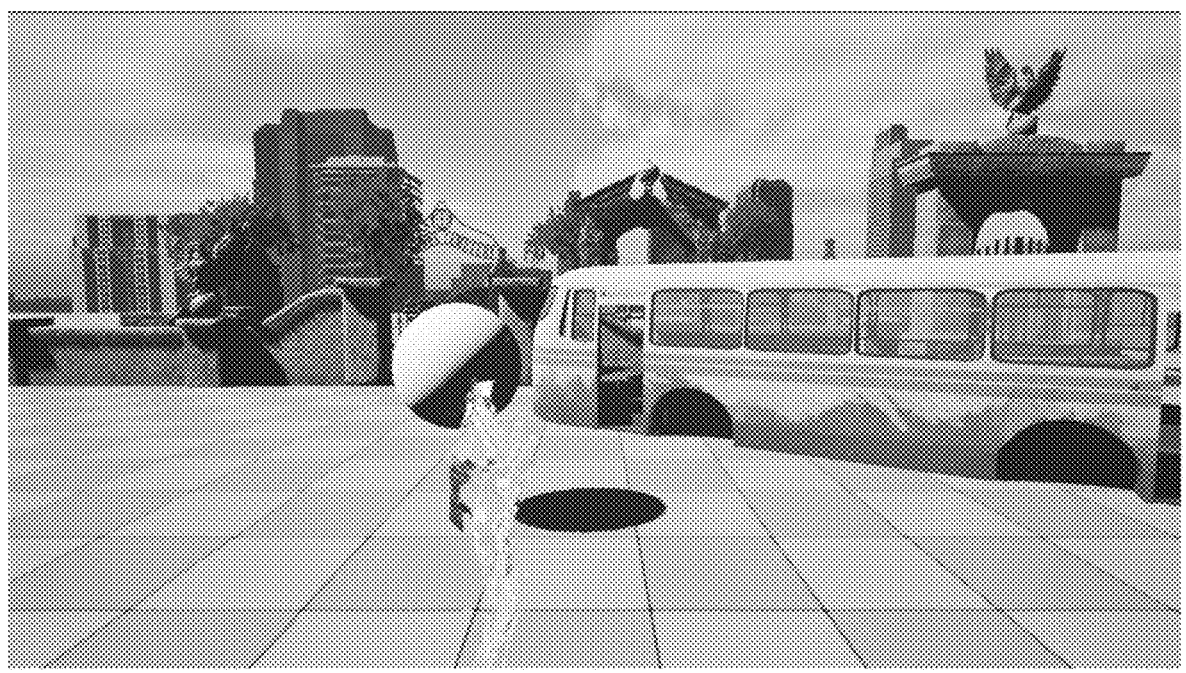
Figure 8L:
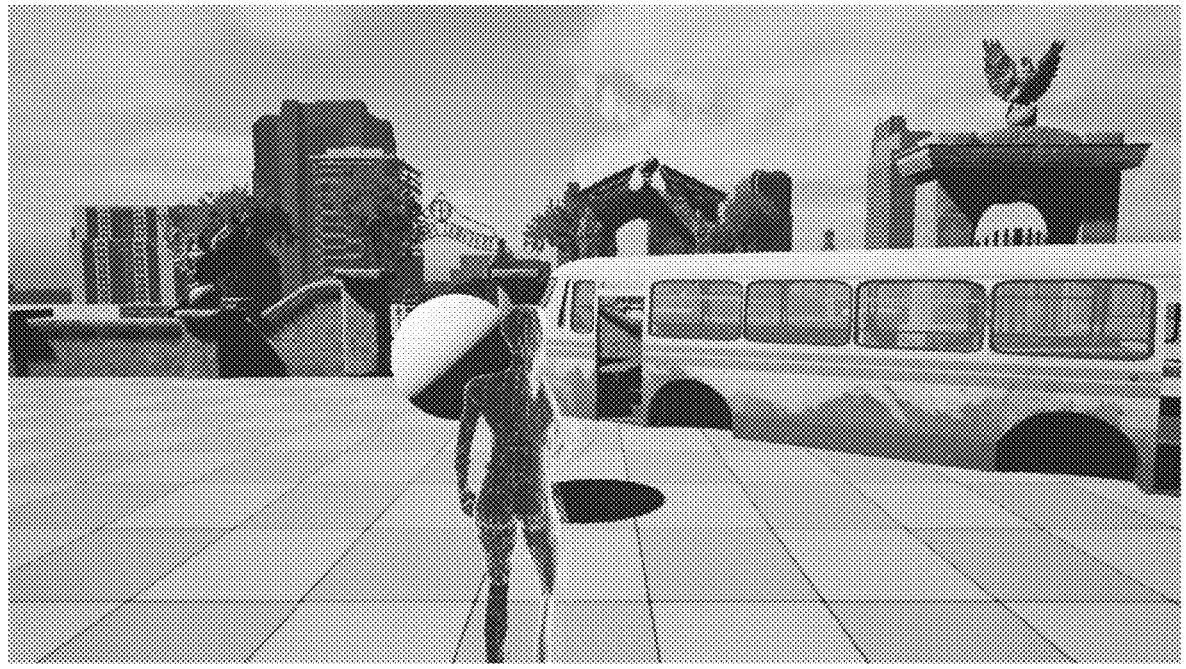
Figure 8M:

FIG. 8G depicts the beginning of the visual materialization of the selected instance of the target region. At this point, only the general outline and colors of the region are observed. In FIGS. 8H and 8I, the objects in the selected instance of the target region become more discernable. In FIG. 8J, a "waterfall" of pixel blocks reveals a clear, in-focus depiction of the selected instance of the target region without depicting the avatar of the transitioning user. In FIG. 8K, the image of the selected instance of the target region is completed, and a depiction of the user's avatar begins to materialize at an entry point within the instance. FIG. 8L depicts the instance of the target region in which the image of the transitioning-player's avatar is more complete. FIG. 8M depicts the target region in which rendering of the transitioning-player's avatar is completed, at which point the region-to-region transition process is completed and the user's avatar is free to move within the selected instance of the target region.

The Locally-Generated Transition Region

The actual visuals and behavior of the locally-generated transition region may vary from implementation to implementation. For example, in one implementation, the transition region gives the visual impression of a digital vortex that the player is travelling through on the way to their destination, and while in it the player will see a view of pixels swirling around. The visual transition from the source region to the transition region appears seamless because the transition region is locally-generated and therefore does not have to wait for information from the game platform or any dedicated game server.

The visuals and behavior that are supported in the transition region may be simple or complex. For example, a simple version of the transition region may display a swirling vortex without displaying the user's avatar, without displaying the avatars of party members, without allowing any user controlled movement, and without allowing any interaction with the environment or party members. On the other hand, a sophisticated transition region may display a user's avatar, allow the avatar to interact with the environment of the transition region, and even provide a "mini-game" that the user can play during the transition to the target region.

A sophisticated transition region may also support peer-to-peer communications, allowing members of a party to chat with each other while they are in their respective transition regions. Peer-to-peer communication may even allow users' avatars to interact with each other in what appears to them as a common transition region, such as engaging in duels while awaiting the transition to the target region to complete.

In more sophisticated versions of the transition region that allow movement within the transition region, the transition from the transition region to the target region may not occur automatically when all of the content of the selected instance of the target region has been received. Instead, the user may be allowed to continue to remain in the transition region (e.g. while playing a mini-game) until the user performs a leave-transition-region action. Such an action may be, for example, selection of a user interface control, completion of the mini-game, or movement into a particular subregion of the transition region.

In one implementation, the transition region may be a "free roam" transition region that has portals to other regions of the virtual environment. Entry of the portal for a free roam transition region may immediately transition the user to a free roam transition region which itself has portals to other regions of the virtual environment. Thus, when a user wants to transition from region A to region B, rather than enter portal B to region B while in region A, a user may enter a portal to a free roam transition region while in region A. Once in the free roam transition region, the user may then enter a portal B to region B.

In one free-roam implementation of the transition region, the transition region is depicted as one or more corridors. Each corridor may have one or more portals. For example, a corridor of the transition region may lead to three doors, each of which serves as a portal marker for a different target region. When the user's avatar enters one of the doors, a region-to-region transition is triggered, causing the user to transition to an instance of the region associated with the door.

Rather than have a single corridor with multiple doors, the transition region may be rendered as having multiple corridors (or even a maze of corridors), where each corridor ends in a portal to a corresponding region. Such portals may be marked with portal markers which, as described above, display out-of-phase depictions of the corresponding regions. As explained above, the view angle used to render the out-of-phase depictions may change as the avatar of the user moves relative to the position of the portal markers.

Region-to-Region Transitions for Parties

When the transition involves multiple players (a "party"), the "leader" of the party may initiate a region-to-region transition for the whole party. In one implementation, a party generally follows the leader, but the system may add certain quality-of-life improvements for party members so they are not "dragged around" by the leader if they no longer want to be.

For example, when a leader enters a portal/selects a mode from a "Quick Warp Menu", the leader will immediately undergo a region-to-region transition as described above. Members of their party will be notified with a UI element to tell them their leader is transitioning level. The party members can either press a button to instantly be moved off to the transition level, or press another to leave the party and not be transitioned. If they do not press either for a certain amount of time (e.g. 5-10 seconds) they will be transitioned with the leader.

When the leader selects an option at the end of playing a game mode, a similar approach is taken—the party members are notified of their leader's choice and can elect to follow immediately, leave the party, or if they don't press anything will follow automatically after a time limit.

Selection of a Target Instance

As explained above, the transition phase of a region-to-region transition involves loading dynamic content items from a selected instance of the target region. The actual selection of the instance may be made at the time the user performs the transition-triggering action, or while the user is still in the viewing phase. Selecting a target instance during the viewing phase enables for a more seamless transition, since the selection of the target instance has already take place before the transition-triggering event. On the other hand, selection of a target instance after the view phase avoids making unnecessary match-making computations in situations where users ultimately decide not to transition to a target region that they are viewing.

The selection of an instance for a particular user or group of users (the group-under-transition) may take into account a variety of factors, including but not limited to: maximum user per instance, size of group-under-transition, skill levels of users in group-under-transition, locality of servers to which the users in group-under-transition are connected, current state of each instance (e.g. in story-driven games, what point in the storyline is current within the instance), storyline positions of users in the group-under-transition, etc.

Figure 1:
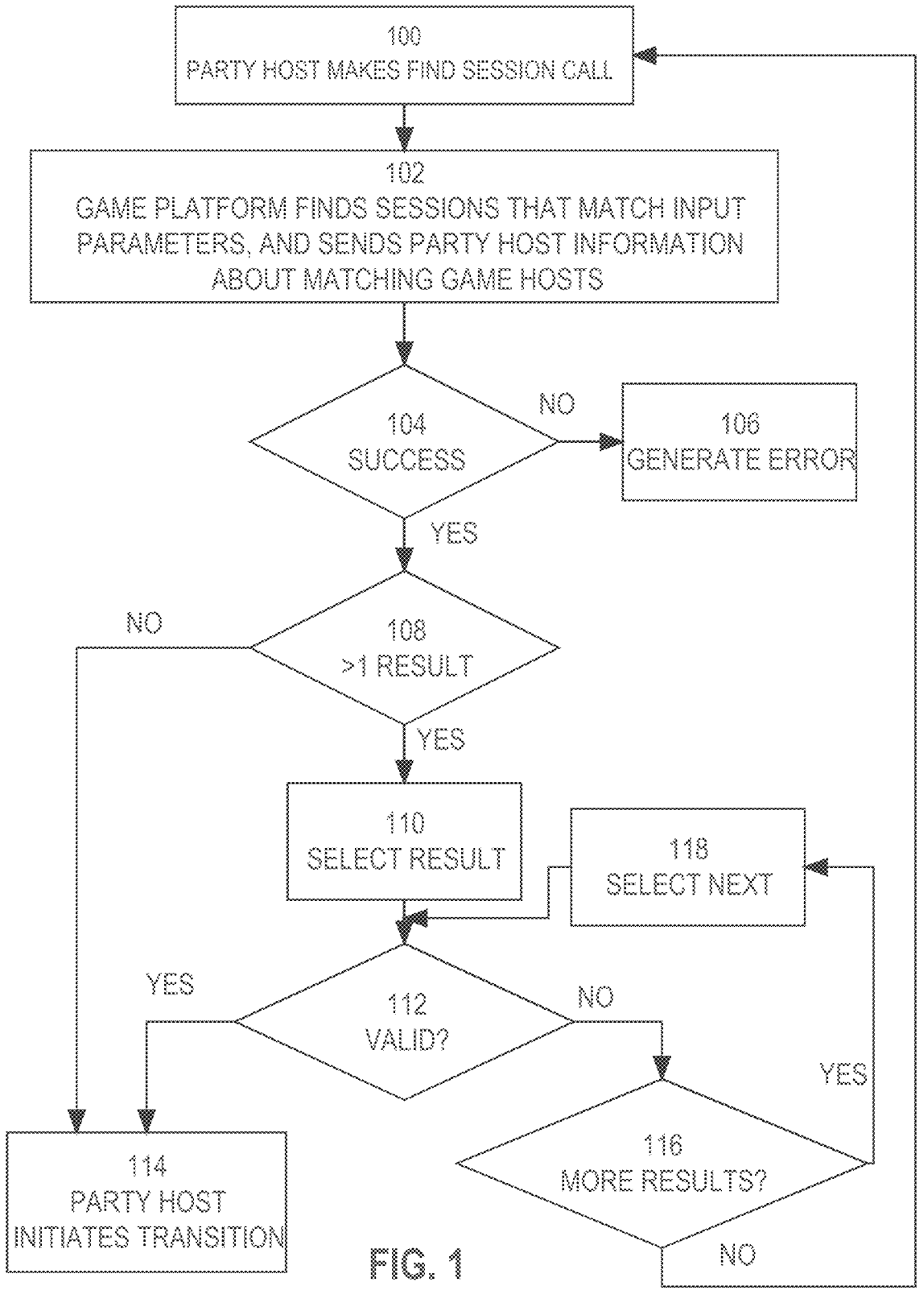
FIG. 1 is a flowchart illustrating steps for matching a group-under-transition to an instance of a target region/game, according to an implementation.

Referring to FIG. 1, it is a flowchart of a process for matching a group-under-transition to an instance of a region, according to one implementation. In the illustrated implementation, the matchmaking process involves interactions between four general components:

the client application of the user that is initiating the region-to-region transition (the "party host")

the client applications of other users in the group-under-transition ("party members")

the game platform a dedicated game server

The process begins at step 100 where the party host makes a "find session" call to the game platform in response to a user triggering a region-to-region transition. At step 102, the game platform finds sessions that match input parameters of the find session call, and sends the party host information about matching game hosts. The input parameters may include, for example, a count of the players in the group-under-transition, a type of game associated with the target region, player block lists, player skill levels for the selected game type, a list of data centers to search for suitable game hosts, etc.

At step 104, the party host determines whether the find session call was successful. If not, an error is generated at step 106. If no error occurs, then control proceeds to step 108 and the party host determines whether there was more than one matching game host. If there was not more than one matching game host, then control proceeds to step 114 where the party host initiates a transition to the selected game host.

If there were more than one matching game host, at step 110 the party host selects one of the results. In some implementations, the selection may be randomly made. In other implementations, the selection may be made based on various factors, such as the latency associated with each candidate game host (e.g. as determined by ping operations). Once a game host is selected at step 110, at step 112 the game host determines whether it will allow the party host or players to connect. If so, then the selected host is a valid host, and control proceeds to step 114. A game host may not be valid for a variety of reasons, including but not limited to:

there is no longer enough space for the entire party the relevant match has started, and "join in progress" is disabled for that host the host has not yet loaded an instance of the region If the selected game host is not valid, then the process loops through steps 116 and 118 to encounter a game host from the initial list that is valid. If a valid host is found, then control passes to step 114, where the party host initiates a transition to the selected game host. Otherwise, if no host on the list is found to be valid, then control returns to step 100 to restart the process of finding a host.

Figure 2:
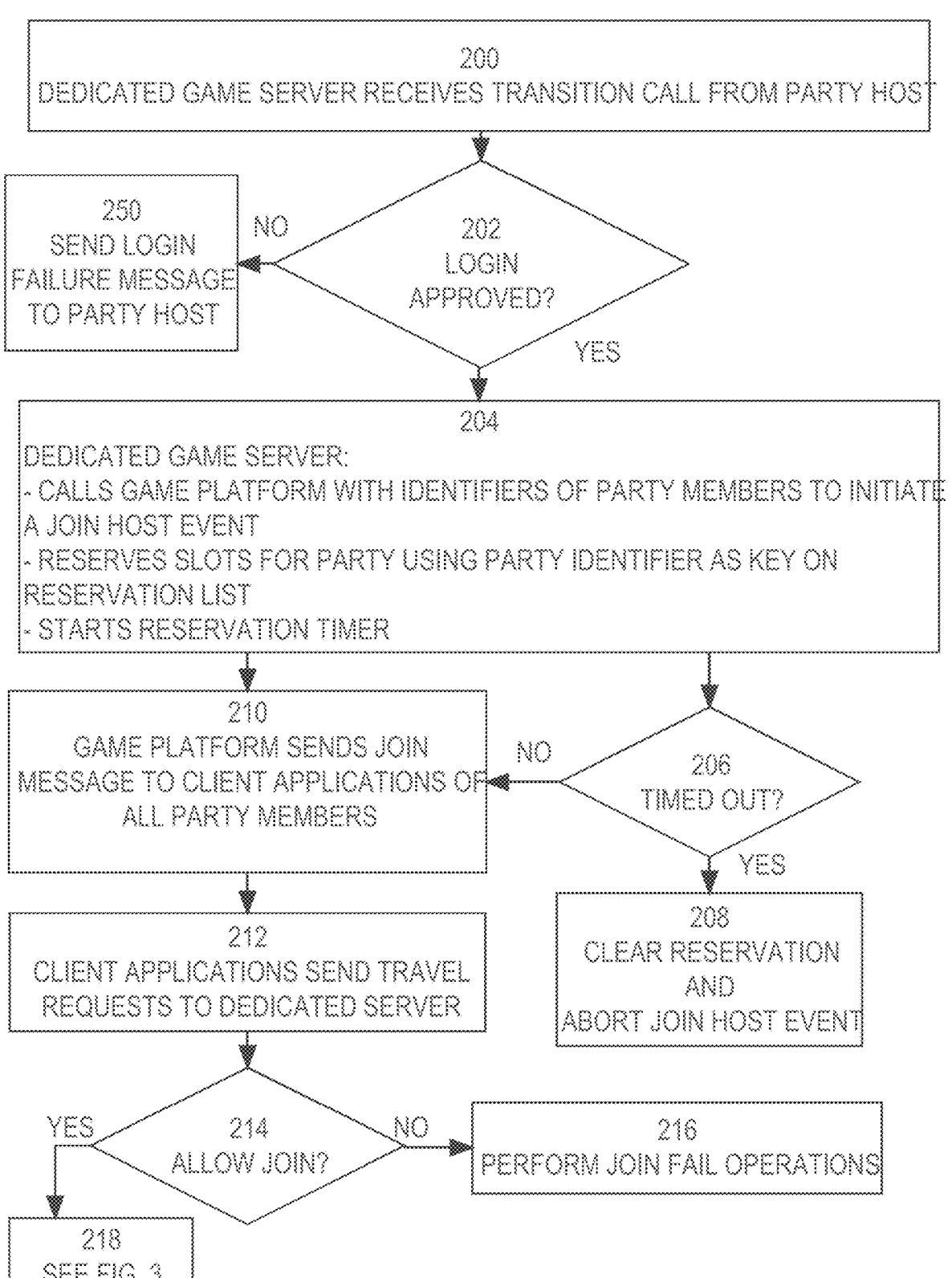
FIG. 2 is a flowchart for initiating a connection of the group-under-transition with a particular instance of the target region/game, according to an implementation.

FIG. 2 is a flowchart that shows steps performed after the party host initiates a transition to a particular game host (dedicated game server). Referring to FIG. 2, at step 200 the dedicated server receives the transition call from the party host. The transition call may include a variety of information, such as an identifier for the party (the group-under-transition), identifiers for each party member, etc. At step 202, the dedicated server determines whether to approve the login of the party. The dedicated server may determine that the login is not approved if, for example, the number of party members, when combined with the number of active players and the number of players on the dedicated server's waiting list, exceeds a particular threshold. If the login is not approved, at step 250 the dedicated server sends a login failure message to the party host. The party host may respond to the login failure message by selecting another game host in the matching game host list. If the list has been exhausted, the party host may send another find session call to restart the process.

If the login is approved, control proceeds to step 204. At step 204, the dedicated game server:

calls the game platform with identifiers of the party members to initiate a join host event reserves slots for the party by placing an entry for the party on a reservation list (the entry may use the party identifier as a key, include the identifiers of the party members, and include a timestamp indicating when the transition call was received starts a reservation timer At step 206, the dedicated server determines whether the reservation for the party has timed out (e.g. some party members have not joined by the end of the reservation period). If the reservation times out, then at step 208 the dedicated server removes the party's entry from the reservation list, and sends the game platform a request to abort the join host event.

At step 210, in response to the join host request from the dedicated game server, the game platform sends a join message to the client applications of all party members. At step 212, in response to the join messages, the client applications send travel requests to the dedicated server. At step 214, in response to each join request, the dedicated server determines whether the corresponding user is allowed to join. A user may not be allowed to join, for example, if the user's identifier does not appear on any entry that is currently on the reservation list. If a user is not allowed to join, then "join fail" operations are performed at step 216. The join fail operation may include, for example:

the dedicated server sending an error message to the client application of the party member whose join was rejected the dedicated server sending a "rejected member" message to the game platform, and the game platform sends a "rejected member" message to the party host.

Figure 3:
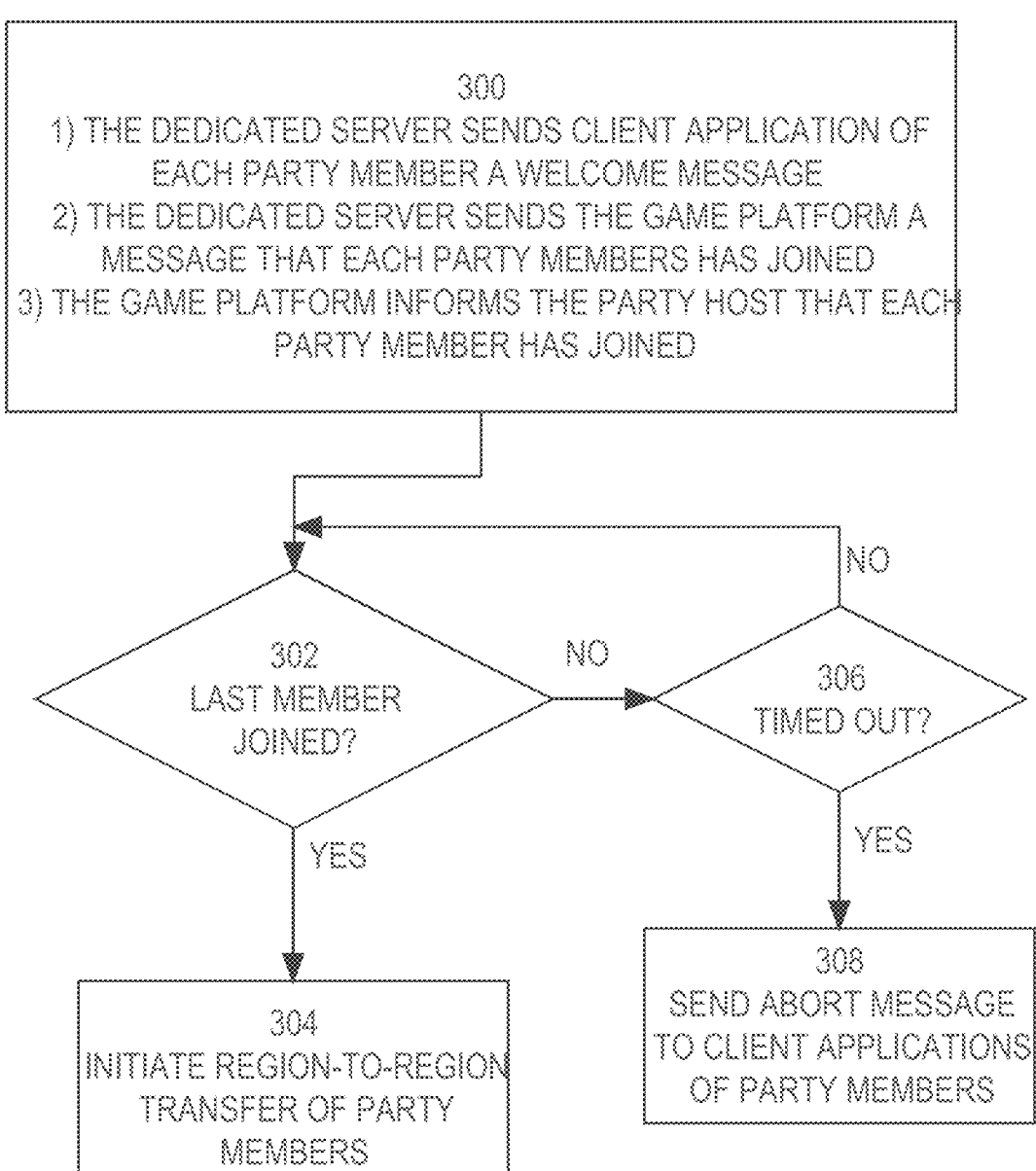
FIG. 3 is a flowchart to completing the group-under-transition matching process to a particular instance of the target region/game, according to an implementation.

FIG. 3 is a flowchart that illustrates steps performed when all members successfully join a session prior to the end of the reservation period. Referring to FIG. 3, at step 300:

the dedicated game server sends the client application of each party member a welcome message, the dedicated game server sends the game platform a message that each party member has joined, and the game platform informs the party host that each member has joined.

Such messages may be sent after all players have successfully joined, incrementally in response to each player in the party being allowed to join. In the incremental implementation, when it is determined that player A is allowed to join, a welcome message may be sent to player A, a join message may be sent to the game platform, and the game platform may send a join indication message to the party host, even though another player in the party (e.g. player B) has not yet joined.

At step 302, after receiving a party joined message from the game platform, the party host determines whether all members have joined. If all members have joined, then control proceeds to step 304 and the region-to-region transfer of the party members to a game instance on the dedicated server is initiated. If the last member has not joined, then step 306 represents a loop where the party host waits while checking for a time out. If a timeout occurs before the last member has joined, then control proceeds to step 308, where the party host sends messages to the client application of the party members to indicate that the attempt to join a session failed.

Virtual Streamed Events

In one implementation, the "screen" that is located at portal may display not only the static elements of the region associated with the portal, but also dynamic elements of a target instance of the region associated with the portal. For example, assume that a "championship match" is taking place within an instance of region B. Under those circumstances, users in region A may gather around the screen at portal B to view the championship match on the screen associated with portal B, without themselves actually transitioning to region B. Displaying an in-phase depiction of an instance of region B to users in region A involves network replication, where information regarding dynamic content from the instance of region B is communicated to instances of region A to enable users in those instances of region A to view, in real-time, the events that occur in that instance of region B.

Exiting an Instance of a Target Region

When a player (or team) is done in a particular region of the virtual environment (e.g. at the end of playing any game mode-whether this is a race, coop mission, competitive mode, etc.), the system may present the player with a common sequence of "end screens". In one implementation, these end screens will show information about the winner of the game, participating players' scores etc. Behind these screens, at the point the player goes into the last screen of the sequence ("exit lobby screen"), the player will be transferred back into the transition level and disconnected from the dedicated game server that was providing the instance they were in. Transferring the players back to the transition level frees up the servers. In one implementation, this happens at the same time to all the players whose avatars were in the instance, so nobody is left in session.

In one implementation, on the exit lobby screen, the player is presented with a list of options:

Continue Playing. On selecting this the player will be matchmade into the next map on their current playlist, attempting to be matchmade with others from the game they just left who also pick this option. The end screen UI is removed and the player sees the swirling pixels in the transition level until matchmaking is complete.

Figure 6:
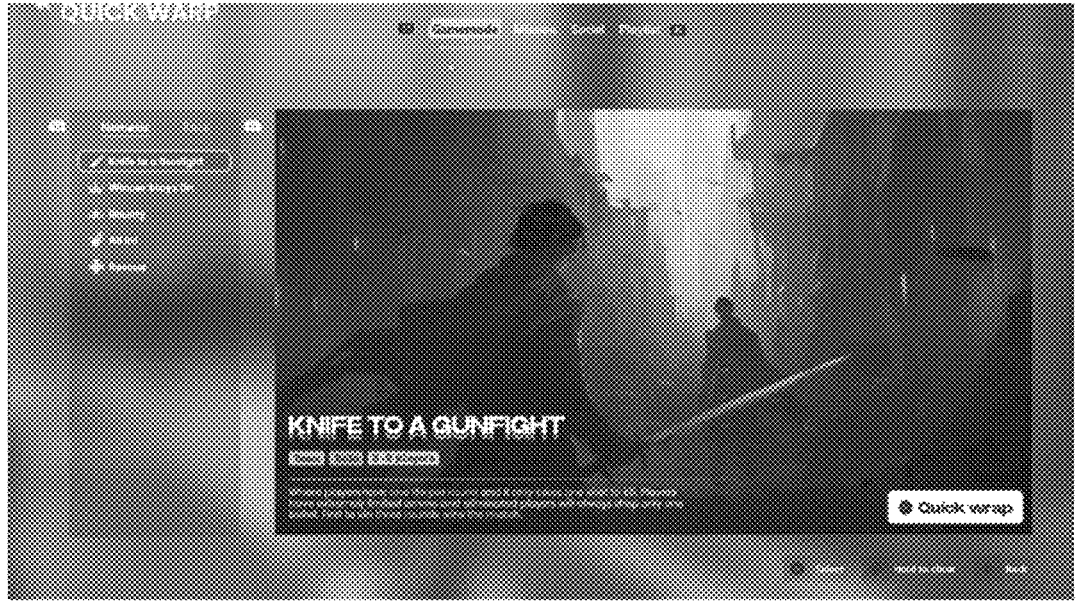
FIG. 6 depicts a Quick Warp UI screen, according to one implementation.
Figure 7:
FIG. 7 depicts a main menu screen in which Quick Warp is a menu option, according to one implementation.

Quick Warp. On selecting this option, the "Quick Warp" UI screen appears and the player is able to select a different mode they want to play. FIG. 6 depicts a Quick Warp UI screen, according to one implementation. On selection of a mode presented in the Quick Warp UI, the Quick Warp UI screen is removed and the player sees the transition level as they are matchmade into the new mode (i.e. while they are automatically matched with an instance of the region associated with the new mode). An alternative mechanism for traveling using the Quick Warp UI is to present "Quick Warp" as an option on a player main menu. FIG. 7 depicts a main menu screen in which Quick Warp is a menu option, according to one implementation.

Return to Player Home. On selection of this option, the player is put into a standalone instance of their Player Home (if they are a party leader they will instead be matchmade into a server with their party). As above, the UI will be removed and the player (or party) will see the transition level as they materialize into the home.

Return to Nexus. When this option is selected, the player is matchmade into a "Nexus server". In one implementation, the Nexus is a region of the virtual environment primarily designed to enable players to travel to other regions. Thus, in a game-oriented implementation, the Nexus may be a region that does not itself implement a game, but instead has portals to several other regions, each of which is associated with a corresponding game mode. As with the other options, selection of the "return to Nexus" option causes the UI to be removed, and player enters the transition level as the automatic matchmaking operation is performed. Once an instance of the Nexus is automatically selected, the player's avatar materializes in the selected instance of the Nexus.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
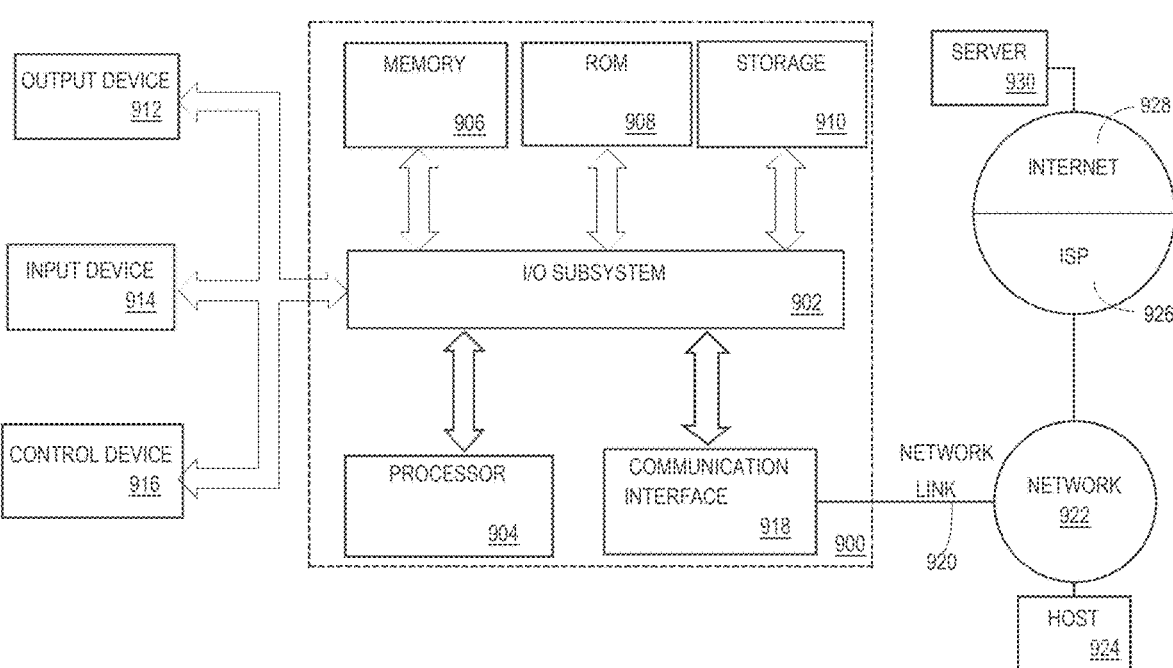
FIG. 9 is a block diagram of a computer system upon which the techniques described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

executing, on a plurality of computing devices, a virtual environment, wherein:

the virtual environment has a plurality of regions;

the plurality of regions includes a first region and a second region;

the plurality of computing devices includes a plurality of dedicated servers;

the plurality of dedicated servers includes a particular set of dedicated servers; and each dedicated server in the particular set of dedicated servers is executing a respective instance of a plurality of instances of the second region;

while an avatar associated with a particular user is located in the first region, a client application associated with the particular user displaying an image that depicts the first region;

wherein the first region includes a particular portal for the second region;

in response to a transition-triggering action performed by the particular user relative to the particular portal, before connecting the client application to any dedicated server in the particular set of dedicated servers, transitioning the particular user from the first region to a transition region that is generated by the client application;

wherein transitioning the particular user from the first region to the transition region includes causing the client application to display an image associated with the transition region;

while the particular user is in the transition region:

completing an automated matchmaking operation to select a target instance of the plurality of instances of the second region, wherein the target instance is being executed by a particular dedicated server of the particular set of dedicated servers;

establishing a connection between the client application and the particular dedicated server;

the client application obtaining, for the particular dedicated server, content information that indicates a current state of dynamic content within the target instance;

transitioning the particular user from the transition region to the target instance of the second region, wherein transitioning the particular user from the transition region to the second region includes causing the client application to display an image in which the avatar of the particular user is located at an entry position in the target instance of the second region.

2. The method of claim 1 wherein the image associated with the transition region includes a depiction of the avatar of the particular user.

3. The method of claim 2 wherein the client application causes the avatar of the particular user to move within the transition region in response to movement input by the particular user.

4. The method of claim 2 wherein the image associated with the transition region includes depictions of avatars of other party members of a party to which the particular user belongs.

5. The method of claim 1 wherein the client application allows the particular user to interact with content of the transition region while the particular user is in the transition region.

6. The method of claim 5 wherein the client application allows the particular user to play a game while the particular user is in the transition region.

7. The method of claim 1 wherein, while the particular user is in the transition region, the client application allows the particular user to interact with other party members, of a party to which the particular user belongs, using peer-to-peer communications.

8. The method of claim 1 further comprising:

prior to the transition-triggering action, detecting a view-triggering action performed by the particular user relative to the particular portal;

in response to the view-triggering action, causing a portal marker associated with the particular portal to display, in the image that depicts the first region, an out-of-phase view of the second region.

9. The method of claim 8 wherein:

the view-triggering action involves movement of the avatar of the particular user into a view-triggering subregion, of the first region, that is associated with the particular portal; and the transition-triggering action involves movement of the avatar of the particular user into a transition-triggering subregion, of the first region, that is associated with the particular portal.

10. The method of claim 9 further comprising, as the avatar of the particular user moves within the view-triggering subregion, modifying a view angle of the out-of-phase view of the second region based on the position of the avatar of the particular user relative to the particular portal.

11. The method of claim 1 wherein the automated matchmaking operation is based, at least in part, on:

a number of members of a party to which the particular user belongs; and a current number of users in each instance of the plurality of instances of the second region.

12. The method of claim 1 wherein:

the image that depicts the first region reflects a state of dynamic content within a particular instance of the first region to which the client application is connected; and in response to the transition-triggering action, the client application disconnects from the particular instance of the first region.

13. The method of claim 1 wherein the image associated with the transition region is a dynamic image that depicts dematerialization of the first region.

14. The method of claim 1 wherein causing the client application to display an image in which the avatar of the particular user is located at an entry position in the target instance of the second region includes displaying a dynamic image in which the second region materializes over time.

15. A method comprising:

executing, on a plurality of computing devices, a virtual environment, wherein:

the virtual environment has a plurality of regions;

the plurality of regions includes a first region and a second region;

the plurality of computing devices includes a plurality of dedicated servers; and

each dedicated server in the plurality of dedicated servers is executing one or more instances of one or more regions of the plurality of regions;

while an avatar associated with a particular user is located in an instance of the first region that is associated with a first dedicated server, a client application associated with the particular user displaying an image that depicts the instance of the first region based on information obtained from the first dedicated server;

wherein the first region includes a first portal for a transition region that is generated by the client application;

in response to a first transition-triggering action performed by the particular user relative to the first portal:

disconnecting the client application from the first dedicated server;

before connecting the client application to any dedicated server in the plurality of dedicated servers, transitioning the particular user from the first region to the transition region;

wherein transitioning the particular user from the first region to the transition region includes causing the client application to display an image associated with the transition region;

while the particular user is in the transition region:

the client application associated with the particular user displaying an image that depicts the transition region;

wherein the transition region includes a second portal for the second region;

in response to a second transition-triggering action performed by the particular user relative to the second portal, transitioning the particular user from the transition region to a target instance of the second region;

wherein transitioning the particular user from the transition region to the target instance of the second region includes:

completing an automated matchmaking operation to select the target instance of the second region, wherein the target instance is being executed by a particular dedicated server of the plurality of dedicated servers;

establishing a connection between the client application and the particular dedicated server;

the client application obtaining, from the particular dedicated server, content information that indicates a current state of dynamic content within the target instance; and causing the client application to display an image in which the avatar of the particular user is located at an entry position in the target instance of the second region.

16. The method of claim 15 wherein the image associated with the transition region includes a depiction of the avatar of the particular user.

17. The method of claim 16 wherein the client application causes the avatar of the particular user to move within the transition region in response to movement input by the particular user.

18. The method of claim 17 wherein:

the first transition-triggering action is movement of the avatar into a transition-triggering subregion, in the first region, that contains a portal marker for the first portal; and the second transition-triggering action is movement of the avatar into a transition-triggering subregion, in the transition region, that contains a portal marker for the second portal.

19. The method of claim 17 wherein:

the image associated with the transition region includes depictions of one or more corridors;

each corridor of the one or more corridors includes one or more portals; and each portal, when approached by the avatar, causes the particular user to transition to an instance of a region that is associated with the portal.

20. The method of claim 15 wherein the client application allows the particular user to interact with content of the transition region while the particular user is in the transition region.

21. A method comprising:

executing, on a plurality of computing devices, a virtual environment, wherein:

the virtual environment has a plurality of regions;

the plurality of regions includes a source region and a plurality of other regions;

the plurality of computing devices includes a plurality of dedicated servers;

each dedicated server of the plurality of dedicated servers executes one or more instances of one or more of the plurality of regions;

while an avatar associated with a particular user is located in the source region, a client application associated with the particular user displaying an image that depicts the source region;

wherein the source region includes a plurality of portals;

wherein each portal of the plurality of portals is associated with a corresponding region of the plurality of other regions;

detecting a view-triggering action performed by the particular user relative to a particular portal of the plurality of portals;

in response to the view-triggering action, causing a portal marker associated with the particular portal to display, in the image that depicts the first region, an out-of-phase view of a target region, of the plurality of other regions, that corresponds to the particular portal;

wherein the view-triggering action involves movement of the avatar of the particular user into a view-triggering subregion, of the source region, that is associated with the particular portal; and as the avatar of the particular user moves within the view-triggering subregion, modifying a view angle of the out-of-phase view of the second region based on the position of the avatar of the particular user relative to the particular portal.

* * * * *